UNITED STATES PATENT OFFICE 2,033,536

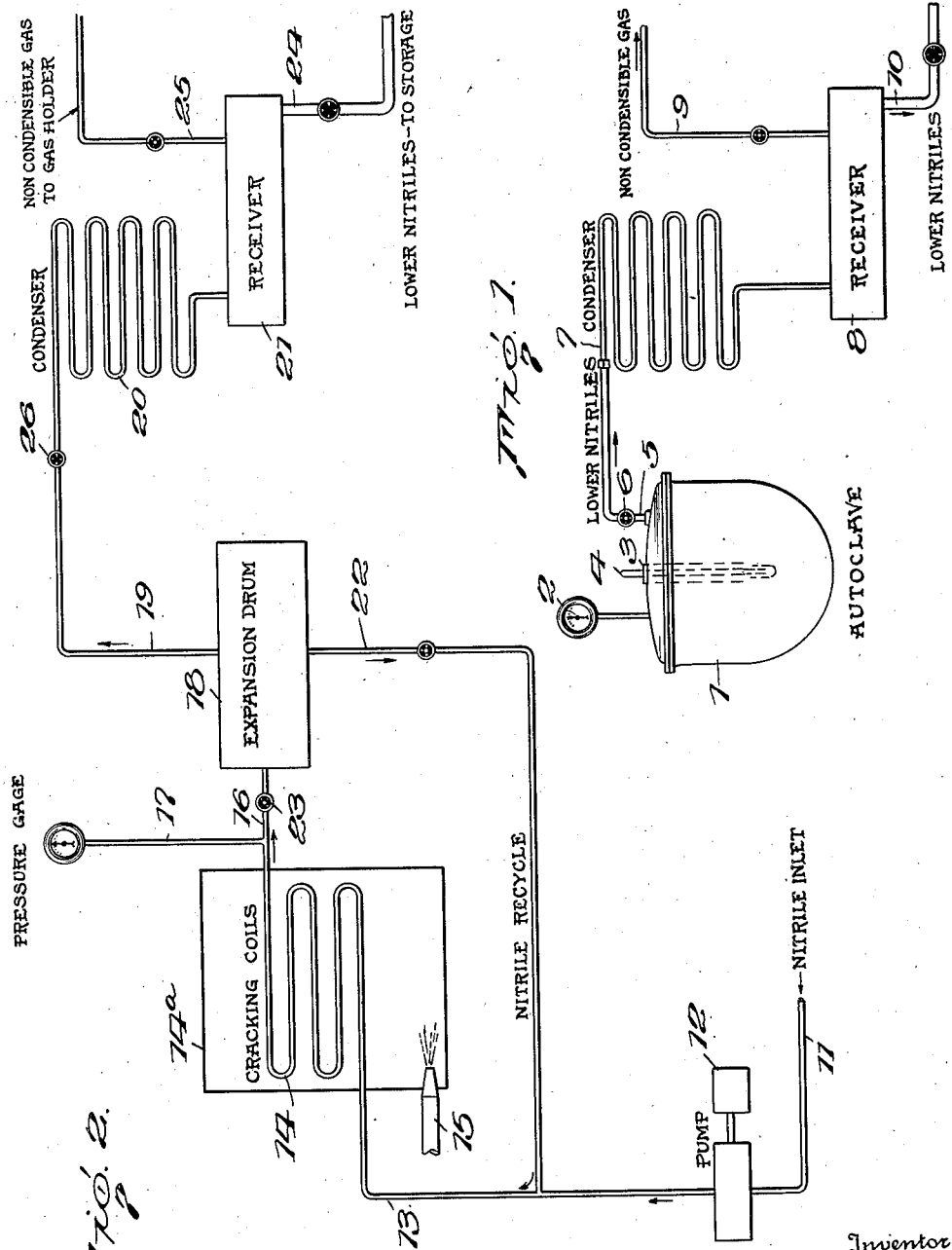

PROCESS OF PREPARING NITRILES

Anderson W. Ralston, William O. Pool, and James Harwood, Chicago, Ill., assignors to Armour and Company, Chicago, Ill., a corporation of Illinois Application March 6, 1935, Serial No. 9,660

18 Claims. (Cl. 260—99.30)

This invention relates to processes of preparing nitriles and it comprises processes wherein a higher fatty acid nitrile is heated under pressure, to "crack" the nitrile whereby nitriles of lower boiling point are obtained.

The relatively lower molecular weight aliphatic nitriles such as valeronitrile, capronitrile, caprylonitrile and many others having from about five to twelve carbon atoms are substances of increasing technical importance. This is very largely because the nitrile, or —CN group is highly reactive with many reagents and can be readily hydrolyzed to the carboxyl group, reduced to the amino group etc. Hence the lower nitriles are starting materials for many different syntheses. They are also useful substances in themselves. They are, for example, useful in insecticidal compositions. Hitherto nitriles have been made from the corresponding amides by heating the amides with dehydrating agents, an expensive method at best.

In the Ralston, U. S. Patent No. 1,991,955 there are described processes of preparing relatively low-boiling nitriles from higher fatty acids such as stearic, palmitic, and others wherein such an acid or its alkyl ester is volatilized, admixed with ammonia, and passed over a dehydrating catalyst at temperatures of the order of about 500° C. In this prior process ammonia or alkyl amines are used as "protective agents" to prevent undesirable decomposition of the fatty acids to tars, gums, resins, and other polymerized products. In that process it is essential that such protective agents be present because the starting materials, that is, fatty acids and esters, readily go over to tars and gums in the absence of ammonia or amines. In the course of the reactions occurring in the stated prior process quantities of higher fatty acid nitriles, such as stearonitrile and oleonitrile, are believed to be first formed and these, while in the vapor state, and in the presence of ammonia or an amine, and a dehydrating catalyst, undergo cracking whereby nitriles or substituted amides of lower fatty acids are formed. In that prior process, it is, as stated, necessary that ammonia or alkyl amines be present in order to prevent undesirable decomposition of the fatty acids or esters. Because of the high reactivity of the nitrile group it was also considered necessary to have ammonia or an alkyl amine present during the catalytic cracking of the higher fatty acid nitrile believed to be initially formed.

We have now discovered that the nitrile group in a higher fatty acid nitrile possesses remarkable stability to heat. Whereas, attempts to "crack" a higher fatty acid itself in the absence of ammonia invariably lead to the formation of polymerized products, tars and the like, we find that higher fatty acid nitriles can be cracked to give lower-boiling nitriles by heating the nitrile under pressure and in the absence of catalysts or protective agents. The nitrile group shows surprising heat resistance and by treating nitriles with heat and pressure we are enabled to crack the hydrocarbon chain of the nitrile without materially affecting the nitrile group itself. This means that we can start with a long-chain nitrile, such as stearonitrile, subect it to heat and pressure, and get, as reaction products, commercial quantities of lower boiling nitriles together with hydrocarbons. In other words, we are splitting the hydrocarbon chain so that from a molecule of higher fatty acid nitrile we can obtain a molecule of a nitrile having less carbon atoms than the starting nitrile and at the same time obtain quantities of hydrocarbons. Very little polymerization occurs.

Our process can be characterized as the pyrolysis of higher fatty acid nitriles under pressure whereby nitriles of lower molecular weight and boiling point are obtained, all this being done in the absence of added protective materials to prevent undesirable decomposition, although a contact catalyst, such as aluminum oxide and others mentioned in the Ralston Patent No. 1,991,955 can be present. These are metal oxide catalysts such as the oxides of thorium, osmium, and iron.

Our process is especially applicable to the preparation of fatty acid nitriles having from about six to ten carbon atoms in the molecule and accordingly we generally start with higher fatty acid nitriles having more than ten carbon atoms. Thus, we usually start with palmito or stearonitrile having sixteen and eighteen carbon atoms respectively. Stearic and palmitic acids are cheap and abundant and our process can be so controlled that nitriles of these fatty acids can be converted to lower nitriles having as low as six or eight carbon atoms, namely capronitrile and caprylonitrile. We can, however, start with nitriles of lower molecular weight than palmito since, as stated, our process is characterized in part by starting with a nitrile of one molecular weight and from it forming a nitrile of lower molecular weight. Our process is also applicable to the treatment of nitriles of unsaturated fatty acids such as oleic, linoleic and linolenic and we do not, therefore, wish to be limited to the treatment of any particular nitrile other than that it shall be an aliphatic nitrile.

On the appended single sheet of drawings we have illustrated diagrammatically two apparatus set-ups which can be used in the practice of our invention. In the drawing, Figure 1 shows a batch method of converting higher nitriles to lower nitriles and Figure 2 shows a continuous system for practicing our process.

Referring to Figure 1, we provide an autoclave 1, which can be heated in any suitable way not shown. Generally these autoclaves are heated by internal heating coils or by external shells; or the autoclave can be placed in a suitable furnace so that heating gases can play directly upon the bottom of the autoclave. These various ways of heating are well-known in the art. The autoclave should be made of steel or other material strong enough to withstand pressures up to about 2000 pounds, although we rarely go as high as that in our process. The autoclave is provided with a pressure gauge 2, a thermometer well 3 containing thermometer 4 and gas outlet 5 provided with valve 6. This outlet leads to condenser 7 which discharges into receiver 8 provided with valved outlets 9 and 10 for non-condensible gases and lower nitriles respectively. Condenser 7 can be water-cooled if necessary.

In the operation of the system shown in Figure 1 the autoclave is charged with the nitrile to be "cracked". After the nitrile has been heated for a length of time sufficient to give a substantial yield of cracked products, valve 6 is opened and the cracked products vaporize and flow through outlet 5 to condenser 7 wherein they are condensed. Valve 6 can then be closed and the autoclave re-heated to crack further quantities of the nitrile therein. When all of the nitrile has been converted to lower nitrile and non-condensible gas the autoclave is recharged with additional quantities of higher nitrile and the heating resumed.

As an example, autoclave 1 is charged with about 1000 parts of stearonitrile having a boiling point at atmospheric pressure of about 360° C. Valve 6 is closed and heat applied to the autoclave until the pressure therein, as recorded on the pressure gauge, reaches about 250 to 300 pounds per square inch. Heating is then discontinued, the autoclave allowed to cool down below 360° C., and valve 6 slowly opened. Low boiling products then distill out and are condensed in 7 and recovered in 8. Advantageously the autoclave is kept at a temperature of about 275° C. during the distillation step so that all material boiling below this temperature is driven out of the autoclave. Any uncracked nitrile thus remains in the autoclave and products obtained are not contaminated by it. Valve 6 can then be closed and the autoclave re-heated for the formation of further quantities of lower nitriles, or it can be re-charged at this point with additional nitrile to be cracked. In this example, the yield of condensed products amounts to about 850 parts and the residue in the autoclave, after the single heating phase described, amounts to about 125 parts. Non-condensible gases, mostly very low boiling hydrocarbons and some hydrogen, amount to about 25 parts. Advantageously these non-condensible portions are sent to a storage tank for recovery and use either as a fuel or as base materials for syntheses. Most of the non-condensible gas is unsaturated hydrocarbons, methane, and hydrogen together with small amounts of hydrogen cyanide.

The condensed product is a pale yellow liquid and contains a mixture of saturated and unsaturated nitriles associated with some liquid hydrocarbons. It can be fractionated into its constituents and fractionation of 100 parts of it gave the following fractions:

25 parts fraction 1 boiling range 40° C.–110° C.
25 parts fraction 2 boiling range 110° C.–175° C.
25 parts fraction 3 boiling range 175° C.–220° C.
20 parts fraction 4 boiling range 220° C.–275° C.
5 parts residue boiling range above 275° C.

Fraction 1 is mostly capronitrile and low boiling hydrocarbons. Fraction 2 is mostly enanthonitrile and capronitrile together with saturated and unsaturated hydrocarbons. Fraction 3 is mostly pelargononitrile, caprylonitrile, enanthonitrile, saturated and unsaturated hydrocarbons. Fraction 4 is mostly lauronitrile, undecylonitrile, caprinitrile, pelargonitrile, saturated and unsaturated hydrocarbons. In each fraction there are some unsaturated nitriles.

In the foregoing example we have not stated the actual temperatures to which the nitrile in autoclave 1 is heated. We find that pressure, rather than temperature, is a very much better criterion of the extent of cracking. Ordinarily we heat the nitrile until the pressure in the autoclave is about 250 to 500 pounds per square inch. This generally means a temperature range of about 500° C. to 800° C. The minimum temperature is about 400° C. At the higher temperatures, namely 700° C. and over, the cracking is more drastic and tends to give more hydrocarbons. Hence, we do not ordinarily wish to operate much above 500° C. Likewise, we can operate at higher pressures, even as high as 1500 pounds per square inch. When we do this, the chemical nature of the products obtained is about the same as that at the lower pressures but the yield of hydrocarbons is greater. Hence, we are lead to believe that the cracking, or so-called "degredation" of the higher fatty acid nitrile takes place in steps. Lower fatty acid nitriles first formed doubtless crack still further as the temperature and pressure is increased. It will, of course, be understood that those skilled in the art to which this invention generally relates will, when starting with various nitriles, such as mixtures of nitriles, exert some control over the pressure in the autoclave, and allow reaction products to distill out when the proper pressure has been reached.

In another example, we charge the autoclave with about 1000 parts of stearonitrile and adjust the valve 6 so that a constant pressure of about 150 to 250 pounds is maintained in the autoclave over a longer heating period. After about five hours, the valve is opened further and the product allowed to distill out. Product obtained is similar to that of the first example, but the residue in the autoclave is greatly reduced. This means, of course, that by keeping the pressure constant in the autoclave substantially all of the nitrile therein can be converted to lower boiling point material.

Instead of using stearonitrile we can start with mixtures of nitriles, such as those obtained from garbage grease fatty acids, or lard fatty acids. These nitriles have a boiling point range of about 325–380° C. The products obtained from them are about the same as those obtained in the above examples. In a similar manner we can use nitriles derived from unsaturated fatty acids. One such material is oleonitrile and, when this is cracked as described, much of the product obtained is highly unsaturated. That is, the nitriles are unsaturated nitriles boiling at temperatures of about 40° C. to 275° C.

In Figure 2 we have shown a schematic flowsheet of a continuous process. In it, molten higher fatty acid nitrile to be cracked is passed to pump 12 through inlet 11. The nitrile flows by way of line 13 to cracking coils 14 disposed in furnace 14—a heated by some suitable means such as burner 15. In the coils the nitrile is heated to a temperature of about 500° C. the pressure being about 150 to 250 pounds per square inch as shown on gauge 17. The cracked products issue from the coils through valved line 16 and flow to expansion drum 18 from which lower boiling products escape by way of line 19 to condenser 20 and thence to receiver 21. Any uncracked, higher boiling nitriles collected in drum 18 are recycled back to inlet line 13. Non-condensible gas is withdrawn through line 25 and lower nitriles are sent to storage (or to a fractionator, not shown) through line 24.

The pressure in the system is regulated by the flow of nitriles to the system, by the temperature in the coils, and by control of valves 23 and 26.

Under the conditions of our process cracking of the nitriles can occur in vapor, liquid, or vapor-liquid phase. At the higher pressures undoubtedly much of the higher fatty acid nitrile is initially in the liquid state and cracking may be substantially liquid phase. But cracking also occurs at lower pressures, such that the nitriles are in the vapor state. We believe that the cracking is probably in mixed vapor and liquid phase but we do not wish to be limited to either vapor or liquid phase cracking. The actual course of the cracking reaction seems to be obscure. As stated above it is probable that the degradation of the nitrile may be step-wise in which case cracking may first be in liquid phase and then, because the first products of the cracking may be vaporous under the conditions employed, further cracking is in vapor phase.

But it is to be understood that we can operate under pressure and temperature conditions which initially, maintain the higher fatty acid nitrile in the liquid state, or in the vapor state, or both.

In the appended claims we advantageously define the temperature to which the higher fatty acid nitrile is to be heated as "a cracking temperature". This temperature is in reality the decomposition temperature of the nitrile and is approximately 400° C. or above. But we do not wish to be limited to any specific temperatures since these will obviously vary with the particular nitrile and also, to some extent, with the pressure. As stated above, pressure is perhaps a better guide to the course of the reaction and extent of cracking than temperature but the nitrile must, of course, be heated to at least its decomposition, or "cracking temperature".

And in the appended claims we mean the term "higher fatty acid nitrile" to embrace nitriles derived from higher fatty acids and having ten or more carbon atoms.

Having thus described our invention what we claim is:—

1. The process of pyrolytically treating higher fatty acid nitriles having at least ten carbon atoms to prepare nitriles of lower molecular weight therefrom, which includes the step of heating the higher fatty acid nitrile to a cracking temperature and under pressure substantially above atmospheric.

2. The process as in claim 1 wherein the higher fatty acid nitrile consists of a mixture of higher fatty acid nitriles having at least ten carbon atoms.

3. The process as in claim 1 wherein the higher fatty acid nitrile consists of garbage grease fatty acid nitriles.

4. The process as in claim 1 wherein the pressure is about 150 to 500 pounds per square inch.

5. The process of pyrolytically treating higher fatty acid nitriles to prepare nitriles of lower molecular weight therefrom, which includes the step of heating a higher fatty acid nitrile containing at least sixteen carbon atoms to a cracking temperature and under pressure substantially above atmospheric.

6. The process as in claim 5 wherein the pressure is about 150 to 500 pounds per square inch.

7. The process of pyrolytically treating higher fatty acid nitriles having at least ten carbon atoms which includes the steps of heating the nitrile at a cracking temperature and under pressure substantially above atmospheric to form nitriles of lower molecular weight therefrom, distilling said lower molecular weight nitriles from the reaction mixture, and condensing the lower molecular weight nitriles.

8. The process as in claim 7 wherein the higher fatty acid nitrile contains at least sixteen carbon atoms.

9. The process as in claim 7 wherein the higher fatty acid nitrile consists of a mixture of higher fatty acid nitriles having at least ten carbon atoms.

10. The process as in claim 7 wherein the higher fatty acid nitrile consists of garbage grease fatty acid nitriles.

11. The process as in claim 7 wherein the pressure is about 150 to 500 pounds per square inch.

12. The process of pyrolytically treating higher fatty acid nitriles having at least ten carbon atoms which includes the steps of heating the nitrile to a cracking temperature as a flowing stream in a cracking zone while maintained under pressure substantially above atmospheric to form lower molecular weight nitriles, separating lower molecular weight nitriles from the reaction products and returning unreacted higher fatty acid nitriles to the flowing stream in the cracking zone.

13. The process as in claim 12 wherein the higher fatty acid nitrile contains at least sixteen carbon atoms.

14. The process as in claim 12 wherein the higher fatty acid nitrile consists of a mixture of higher fatty acid nitriles having at least ten carbon atoms.

15. The process as in claim 12 wherein the higher fatty acid nitrile consists of garbage grease fatty acid nitriles.

16. The process as in claim 12 wherein the pressure is about 150 to 500 pounds per square inch.

17. The process of pyrolytically treating stearonitrile which comprises heating stearonitrile to a temperature of at least 400° C. under a pressure of at least 150 pounds per square inch.

18. The process of pyrolytically treating higher fatty acid nitriles containing at least ten carbon atoms which comprises heating the nitrile to a temperature of at least 400° C. under a pressure of at least 150 pounds per square inch.

ANDERSON W. RALSTON.
WILLIAM O. POOL.
JAMES HARWOOD.